US011156280B2

(12) United States Patent
Kurth

(10) Patent No.: US 11,156,280 B2
(45) Date of Patent: Oct. 26, 2021

(54) DRIVE DEVICE FOR A MOTOR VEHICLE

(71) Applicant: SCHAEFFLER TECHNOLOGIES AG & CO. KG, Herzogenaurach (DE)

(72) Inventor: Franz Kurth, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/334,925

(22) PCT Filed: Oct. 9, 2017

(86) PCT No.: PCT/DE2017/100851
§ 371 (c)(1),
(2) Date: Mar. 20, 2019

(87) PCT Pub. No.: WO2018/068789
PCT Pub. Date: Apr. 19, 2018

(65) Prior Publication Data
US 2019/0263243 A1 Aug. 29, 2019

(30) Foreign Application Priority Data

Oct. 14, 2016 (DE) .......................... 102016220060.7

(51) Int. Cl.
*F16H 48/22* (2006.01)
*B60K 1/00* (2006.01)
*F16H 48/36* (2012.01)

(52) U.S. Cl.
CPC ........ *F16H 48/22* (2013.01); *B60K 2001/001* (2013.01); *F16H 2048/368* (2013.01);
(Continued)

(58) Field of Classification Search
CPC ..... F16H 2200/2097; F16H 2200/2035; F16H 2200/2007; F16H 2200/0034; B60K 1/00–2001/001
See application file for complete search history.

(56) References Cited

U.S. PATENT DOCUMENTS 4,479,404 A * 10/1984 Stockton ................... F16H 3/66
475/149
4,928,227 A * 5/1990 Burba ........................ B60L 7/14
701/66
(Continued)

FOREIGN PATENT DOCUMENTS

CN 103363037 A 10/2013
CN 103889753 A 6/2014
(Continued)

OTHER PUBLICATIONS

International Search Report for PCT Application No. PCT/DE2017/100851, dated Mar. 31, 2018, 5 pages.

*Primary Examiner* — Ernesto A Suarez
*Assistant Examiner* — James J Taylor, II
(74) *Attorney, Agent, or Firm* — Dickinson Wright PLLC

(57) ABSTRACT

A transmission comprises a first planetary stage that has a first planetary gear train with a first set of planet gears configured to rotate on a first planet carrier and mesh with a first sun gear and a first ring gear, a second planetary stage wherein the second planetary stage has a second planetary gear train with a second set of planet gears, wherein the second set of planet gears are configured to rotate on a second planet carrier and mesh with a second sun gear and a second ring gear, wherein the first planet carrier is connected to the second sun gear, wherein the first sun gear is operatively connected to a drive shaft, a differential stage operatively connected to the second planet carrier and configured to distribute power, and a double-clutch device that includes a first and second clutch and is located between the planetary stages.

20 Claims, 1 Drawing Sheet

(52) U.S. Cl.
CPC ............... *F16H 2200/0034* (2013.01); *F16H 2200/2007* (2013.01); *F16H 2200/2035* (2013.01); *F16H 2200/2097* (2013.01)

(56) References Cited

U.S. PATENT DOCUMENTS

| | | | | |
|---|---|---|---|---|
| 7,300,374 | B2 * | 11/2007 | Bucknor | B60L 50/61 475/5 |
| 9,174,523 | B2 * | 11/2015 | Lee | B60K 6/445 |
| 9,221,335 | B2 * | 12/2015 | Wirth | B60K 1/00 |
| 9,441,717 | B2 * | 9/2016 | Smetana | F16H 48/36 |
| 9,482,328 | B2 * | 11/2016 | Kao | F16H 1/46 |
| 9,688,267 | B2 | 6/2017 | Tsuda et al. | |
| 9,777,816 | B2 * | 10/2017 | Petersen | B60K 1/00 |
| 9,777,818 | B2 | 10/2017 | Valente et al. | |
| 9,822,860 | B2 | 11/2017 | Kaltenbach et al. | |
| 9,950,607 | B2 * | 4/2018 | Littlefield | F16H 37/02 |
| 9,995,370 | B2 * | 6/2018 | Staake | F16H 3/66 |
| 2014/0235394 | A1 | 8/2014 | Smetana et al. | |
| 2016/0084356 | A1 | 3/2016 | Beck et al. | |

FOREIGN PATENT DOCUMENTS

| | | |
|---|---|---|
| CN | 104033545 A | 9/2014 |
| CN | 104114903 A | 10/2014 |
| CN | 104154192 A | 11/2014 |
| CN | 104334920 A | 2/2015 |
| CN | 105346371 A | 2/2016 |
| CN | 105697693 A | 6/2016 |
| DE | 102011088668 A1 | 6/2013 |
| DE | 102012011686 A1 | 12/2013 |
| DE | 102013204227 A1 | 9/2014 |
| DE | 102014206666 A1 | 10/2015 |
| DE | 112014001283 T5 | 11/2015 |
| DE | 112015000464 T5 | 9/2016 |
| EP | 2097659 A2 | 9/2009 |
| WO | 2014102030 A1 | 7/2014 |

\* cited by examiner

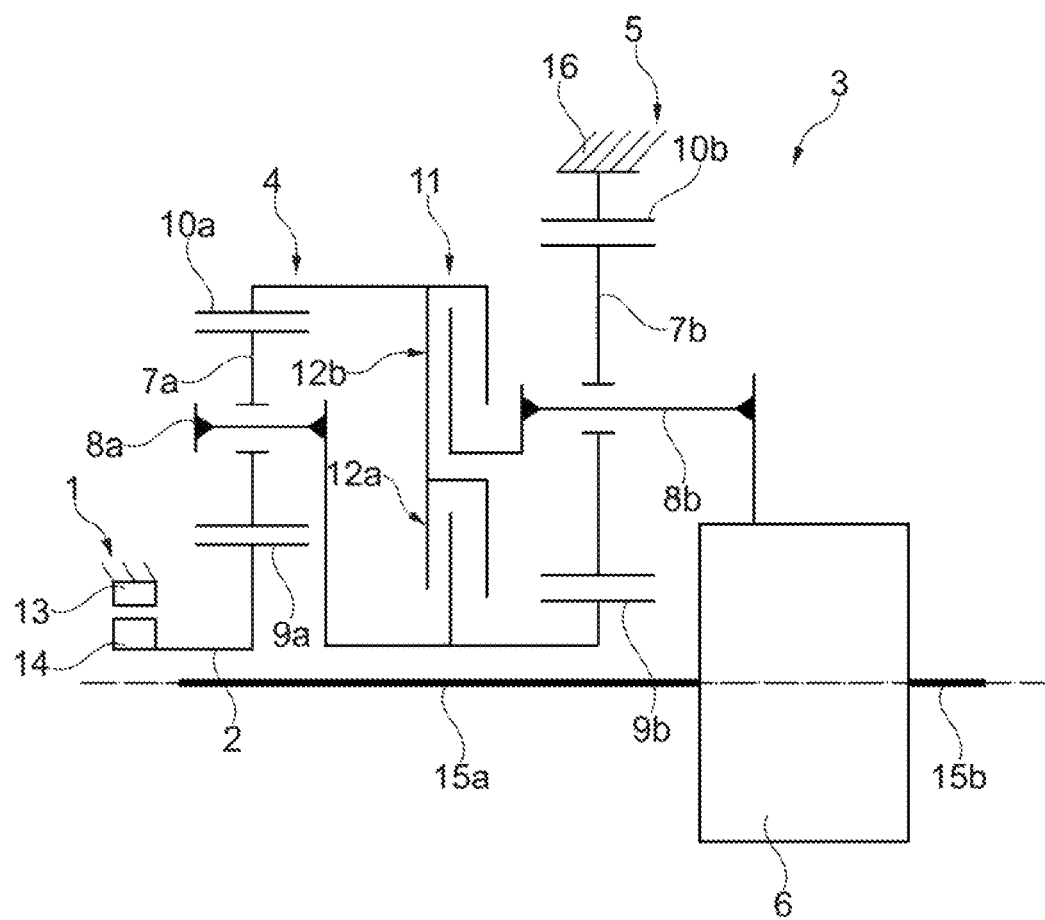

DRIVE DEVICE FOR A MOTOR VEHICLE

CROSS-REFERENCE TO RELATED APPLICATIONS

This application is the U.S. National Phase of PCT/DE2017/100851 filed Oct. 9, 2017, which claims priority to DE 102016220060.7 filed Oct. 14, 2016, the entire disclosures of which are incorporated by reference herein.

TECHNICAL FIELD

The disclosure relates to a drive device for a motor vehicle, in particular for an electrically driven motor vehicle.

BACKGROUND

A drive device that has at least one electric drive machine, at least one first planetary drive, at least one clutch, and a differential is disclosed in DE 10 2011 088 668 A1. A rotor shaft of the drive machine is coupled to a first connecting shaft of the planetary drive formed by at least three connecting shafts for conjoint rotation therewith. A second connecting shaft of the first planetary drive is can be secured by a shifting collar of the clutch to a component of the drive device for conjoint rotation therewith. A third connecting shaft of the first planetary drive is operatively connected to an output shaft of the differential. The shifting collar is either in a form fitting engagement with the second connecting shaft of the first planetary drive or it can be slid into a torque transferring operative connection with the output shaft of the differential.

DE 10 2012 011 686A1 discloses a drive device for a motor vehicle that has an electric drive machine, a transmission formed by two planetary stages and a differential, as well as a clutch. The transmission can be coupled via the clutch to the electric drive machine for power transfer, or it can be disengaged, for example, for a "coasting" state of the electric machine.

DE 11 2014 001 283 T5 discloses a drive device for a motor vehicle that has an electric drive machine, a transmission formed by a shiftable planetary gearing with two clutches, and a differential gearing. The planetary gearing is formed by two planetary stages. The planetary gearings are locked to one another via the clutch such that the transmission functions with a gear transmission ratio of 1:1. The rotational rate of the electric machine can be reduced by the second clutch.

SUMMARY

The object of the present disclosure is to further develop a drive device for a motor vehicle.

The drive device for a motor vehicle according to the disclosure comprises an electric drive machine, which is operatively connected to a transmission via a drive shaft, wherein the transmission has at least a first and second planetary stage and a differential stage, wherein the first planetary stage has a first planetary gear train with numerous planet gears, wherein the planet gears of the first planetary gear train can rotate on a first planet carrier and mesh with a first sun gear and a first ring gear, wherein the second planetary state has a second planetary gear train with numerous planet gears, wherein the planet gears of the second planetary gear train can rotate on a second planet carrier and mesh with a second sun gear and a second ring gear, wherein the first planet carrier is connected to the second planet carrier for conjoint rotation therewith, wherein the second ring gear is secured in a stationary manner to a housing, and wherein the second planet carrier is operatively connected to the differential stage, wherein a double-clutch device with a first and second power-shiftable clutch is located between the first and second planetary stages, wherein the first ring gear can be connected to the second sun gear via the first clutch, and wherein the first ring gear can be connected to the second planet carrier via the second clutch.

The term "operatively connected" may be understood to mean that two transmission elements can be connected directly to one another, or that further transmission elements are located between two transmission elements, e.g. one or more shafts or gearwheels. Two gearwheels that mesh or engage with one another transfer a torque and a rotational rate from the one gearwheel to the other gearwheel. A gearwheel is understood to be a sun gear, a ring gear, or a planet gear of a planetary gear train.

A double-clutch device may be a device with two power-shiftable clutches. Furthermore, the term "power-shiftable clutch" may refer to a device with at least a disengaged and an engaged state, and that can be shifted between the at least two states while subjected to a load. In the disengaged state, the clutch transfers no torque. The clutch thus may transfer a torque between two shafts operatively connected to said clutch when in an at least partially engaged state, wherein the two shafts are connected for conjoint rotation when the clutch is engaged. Furthermore, when the first clutch is engaged, the first ring gear is connected to the second sun gear for conjoint rotation therewith, wherein when the second clutch is engaged, the first ring gear is connected to the second planet carrier for conjoint rotation therewith. The respective clutches are frictional clutches, in particular. Furthermore, the two clutches may be coaxial to one another. In particular, each clutch can be actuated by a respective actuator, in order to disengage or engage the respective clutch. The actuator can be hydraulic, electromechanical, electromagnetic, or pneumatic.

The disclosure includes the technical teaching that when both clutches are disengaged, power transfer is shut off. When the first clutch is engaged and the second clutch is disengaged, a first transmission ratio is obtained, wherein an engagement of the second clutch and disengagement of the first clutch results in a second transmission ratio. The first transmission ratio may be different than the second transmission ratio. By way of example, the first transmission ratio can be greater than the second transmission ratio. Alternatively, the first transmission ratio is less than the second transmission ratio.

The electric drive machine may have a stator and a rotor, wherein the rotor is connected to the drive shaft for conjoint rotation therewith. In addition, the drive shaft is in the form of a rotor shaft. The differential stage may form a spur gear differential, wherein the differential stage distributes a drive power from the drive machine to a first and second output shaft. In particular, the drive machine is coaxial to the differential stage. The drive shaft may be coaxial to both output shafts. In particular, the drive shaft forms a hollow shaft, wherein one of the two output shafts passes axially through the drive shaft. The two output shafts may be located on a common drive axis. The differential stage has first and second planetary gear trains, wherein the planet gears of the first planetary gear train of the differential stage mesh with gear teeth on the first output shaft, wherein the planet gears of the second planetary gear train mesh with teeth on the second output shaft, and wherein the planet gears of both planetary gear trains mesh in pairs.

Further measures improving the disclosure shall be explained in greater detail below in conjunction with the description of an embodiment of the disclosure based on the sole FIGURE. The single FIGURE shows a simplified, schematic illustration of the construction of a drive device according to the disclosure.

BRIEF DESCRIPTION OF THE DRAWINGS

According to the FIG. 1, the drive device according to the disclosure for a motor vehicle (not shown), has an electric drive machine 1 and a transmission 3. The drive machine 1 has a stator 13 and a rotor 14. A drive power of the drive machine is supplied to the transmission 3 via a drive shaft 2, located between the drive machine 1 and the transmission 3, forming a rotor shaft.

DETAILED DESCRIPTION

The transmission 3 comprises first and second planetary stages 4, 5, and a differential stage 6. The differential stage 6 is in the form of a spur gear differential, and distributes a drive power of the drive machine 1 to a first and second output shaft 15a, 15b. The drive shaft 2 is coaxial to the two output shafts 15a, 15b. Furthermore, the drive machine 1 is coaxial to the differential stage 6.

The first planetary stage 4 has a first planetary gear train with numerous planet gears 7a, wherein the planet gears 7a of the first planetary gear train can rotate on a first planet carrier 8a and mesh with a first sun gear 9a and a first ring gear 10a. Furthermore, the planet gears 7a of the first planetary gear train are located radially between the first sun gear 9a and the first ring gear 10a. The drive shaft 2 is connected to the first sun gear 9a for conjoint rotation therewith.

Furthermore, the second planetary stage 5 has a second planetary gear train with numerous planet gears 7b, wherein the planet gears 7b of the second planetary gear train can rotate on a planet carrier 8b and mesh with a second sun gear 9b and a second ring gear 10b. Furthermore, the planet gears 7b of the second planetary gear train are located radially between the second sun gear 9b and the second ring gear 10b. The ring gear is secured in a stationary manner to the housing 16 of the transmission 3. Furthermore, the second planet carrier 8b is operatively connected to the differential stage 6.

Moreover, a double-clutch device 11 with first and second power-shiftable clutches 12a, 12b is located between the first and second planetary stages 4, 5. The first ring gear 10a can be connected via the first clutch 12a to the second sun gear 9b. Because the second sun gear 9b is connected to the first planet carrier 8a for conjoint rotation therewith, when the first clutch 12a is engaged, the first planet carrier 8a, the first ring gear 10a, and the second sun gear 9b are connected to one another for conjoint rotation. Furthermore, the first ring gear 10a can be connected to the second planet carrier 8b via the second clutch 12b. When the first clutch 12a is engaged and the second clutch 12b is disengaged, a first transmission ratio is obtained, and when the second clutch 12b is engaged, and the first clutch 12a is disengaged, a second transmission ratio is obtained. The first transmission ratio differs from the second transmission ratio. By disengaging both clutches 12a, 12b, the power transfer is shut off, wherein the drive machine 1 is decoupled from the two output shafts 15a, 15b.

REFERENCE SYMBOLS 1 drive machine
2 drive shaft
3 transmission
4 first planetary stage
5 second planetary stage
6 differential stage
7a, 7b planet gears
8a, 8b planet carriers
9a, 9b sun gears
10a, 10b ring gears
11 double-clutch device
12a, 12b clutch
13 stator
14 rotor
15a, 15b output shaft
16 housing

The invention claimed is:

1. A drive device for a motor vehicle, comprising:
an electric drive machine connected to a transmission via a drive shaft, wherein the transmission has at least first and second planetary stages and a differential stage, wherein the first planetary stage has a first planetary gear train with numerous planet gears, wherein the planet gears of the first planetary gear train can rotate on a first planet carrier and mesh with a first sun gear and a first ring gear, wherein the second planetary stage has a second planetary gear train with numerous planet gears, wherein the planet gears of the second planetary gear train can rotate on a second planet carrier and mesh with a second sun gear and a second ring gear, wherein the first planet carrier is connected to the second sun gear for conjoint rotation therewith, wherein the drive shaft is operatively connected to first sun gear, wherein the second ring gear is also secured in a stationary manner to a housing, wherein the first planet carrier is fixed to the second sun gear, and wherein the second planet carrier is directly connected to the differential stage, wherein a double-clutch device with a first and second power-shiftable clutches is located axially between the first and second planetary stages, wherein the first and second power-shiftable clutches are radially-nested frictions clutches, wherein the first ring gear is connected to the second sun gear via the first clutch such that the first ring gear and the second sun gear rotate in unison when the first clutch is engaged, and wherein the first ring gear is rotationally fixed to the second planet carrier via the second clutch such that the first ring gear and the second planet carrier rotate in unison when the second clutch is engaged.

2. The drive device according to claim 1, wherein when the first and second power-shiftable clutch are disengaged, power transfer is shut off.

3. The drive device of claim 2, wherein when the first clutch is engaged, and the second clutch is disengaged, a first transmission ratio is obtained, wherein when the second clutch is engaged and the first clutch is disengaged, a second transmission ratio is obtained.

4. The drive device of claim 3, wherein the first transmission ratio differs from the second transmission ratio.

5. The drive device of claim 1, wherein the electric drive machine has a stator and a rotor, wherein the rotor is connected to the drive shaft for conjoint rotation therewith.

6. The drive device of claim 1, wherein the differential stage is a spur gear differential, wherein the differential stage distributes a drive power of the drive machine to a first and second output shafts.

7. The drive device of claim 1, wherein the drive machine is coaxial to the differential stage.

8. A drive device for a motor vehicle, comprising:
an electric drive machine;
a transmission connected to the electric drive machine via a drive shaft, wherein the transmission includes:
a first planetary stage, wherein the first planetary stage has a first planetary gear train with a first set of planet gears configured to rotate on a first planet carrier and mesh with a first sun gear and a first ring gear;
a second planetary stage wherein the second planetary stage has a second planetary gear train with a second set of planet gears, wherein the second set of planet gears are configured to rotate on a second planet carrier and mesh with a second sun gear and a second ring gear, wherein the first planet carrier is connected to the second sun gear for conjoint rotation therewith, wherein the drive shaft is operatively connected to the first sun gear, wherein the second ring gear is also secured to a housing, wherein the first planet carrier is fixed to the second sun gear;
a differential stage directly connected to the second planet carrier; and
a double-clutch device including a first and second clutches located axially between the first and second planetary stages, wherein the first and second clutches are radially-nested frictions clutches, wherein the first ring gear is rotationally fixed to the second sun gear via the first clutch such that the first ring gear and the second sun gear rotate in unison when the first clutch is engaged, and wherein the first ring gear is rotationally fixed to the second planet carrier via the second clutch such that the first ring gear and the second planet carrier rotate in unison when the second clutch is engaged.

9. The drive device of claim 8, wherein the first and second clutches are configured to shut off power transfer when disengaged.

10. The drive device of claim 8, wherein the double-clutch device is configured to:
have a first transmission ratio when the first clutch is engaged and the second clutch is disengaged; and
have a second transmission ratio when the first clutch is disengaged and the second clutch is engaged.

11. The drive device of claim 10, wherein the first transmission ratio is different than the second transmission ratio.

12. The drive device of claim 10, wherein the first transmission ratio is greater than the second transmission ratio.

13. The drive device of claim 8, wherein the electric drive machine includes a stator and a rotor, wherein the rotor is connected to the drive shaft for conjoint rotation therewith.

14. The drive device of claim 8, wherein the differential stage forms a spur gear differential and is configured to distribute a drive power from the drive machine to a first and second output shaft.

15. The drive device of claim 14, wherein the first and second output shafts are located on a common drive axis.

16. The drive device of claim 14, wherein the drive machine is coaxial to the differential stage.

17. A transmission connected to an electric drive machine, the transmission comprising:
a first planetary stage, wherein the first planetary stage has a first planetary gear train with a first set of planet gears configured to rotate on a first planet carrier and mesh with a first sun gear and a first ring gear;
a second planetary stage wherein the second planetary stage has a second planetary gear train with a second set of planet gears, wherein the second set of planet gears are configured to rotate on a second planet carrier and mesh with a second sun gear and a second ring gear, wherein the first planet carrier is connected to the second sun gear for conjoint rotation therewith, wherein the first sun gear is operatively connected to a drive shaft, wherein the first planet carrier is fixed to the second sun gear;
a differential stage operatively connected to the second planet carrier, wherein the differential stage is configured to distribute drive power of the drive machine to a first and second output shaft; and
a double-clutch device located axially between the first and second planetary stages, wherein the double-clutch device includes a first and second clutch, wherein the first and second clutch are radially-nested frictions clutches, wherein the first ring gear is rotationally fixed to the second sun gear via the first clutch such that the first ring gear and the second sun gear rotate in unison when the first clutch is engaged.

18. The transmission of claim 17, wherein the double-clutch device is configured to obtain a first transmission ratio when the first clutch is engaged and the second clutch is disengaged, and the double-clutch device is further configured to obtain a second transmission ratio when the second clutch is engaged and the first clutch is disengaged.

19. The transmission of claim 17, wherein the double-clutch device is configured to shut off power transfer and decouple the first and second output shafts from the electric drive machine when the first and second clutch are disengaged.

20. The transmission of claim 17, wherein the first ring gear is rotationally fixed to the second planet carrier via the second clutch such that the first ring gear and the second planet carrier rotate in unison when the second clutch is engaged.

* * * * *